March 26, 1940.　　A. H. STEWART　　2,194,814
APPARATUS FOR MAKING INTERSTITIAL AGGREGATES
Filed April 6, 1936　　3 Sheets-Sheet 2
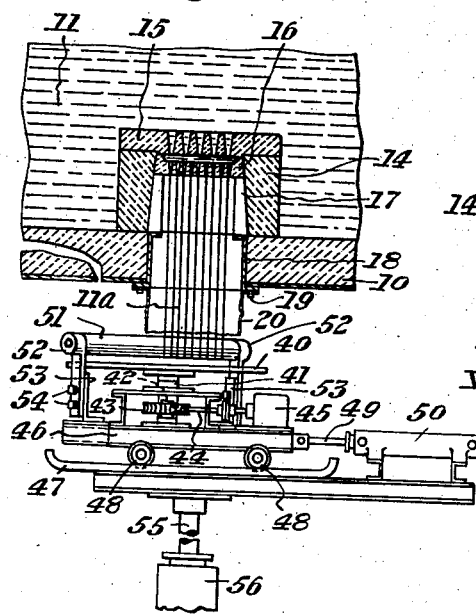
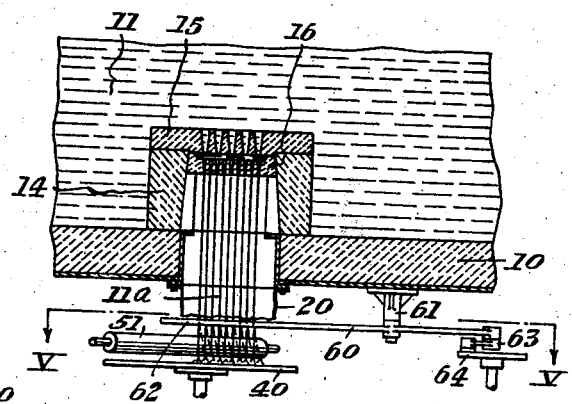
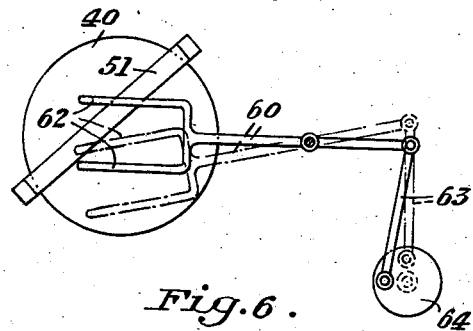
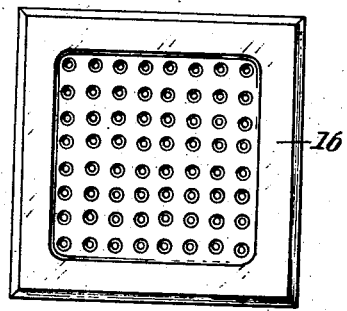
INVENTOR
Andrew H. Stewart
By
Clarence P. Byrnes
Attorney March 26, 1940.  A. H. STEWART  2,194,814
APPARATUS FOR MAKING INTERSTITIAL AGGREGATES
Filed April 6, 1936  3 Sheets-Sheet 3
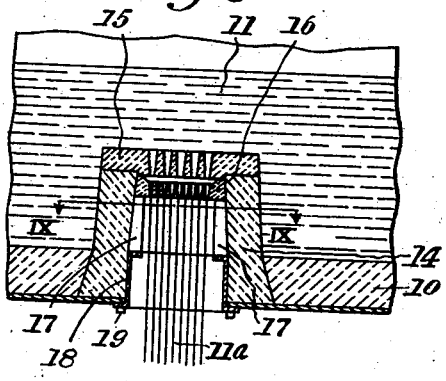
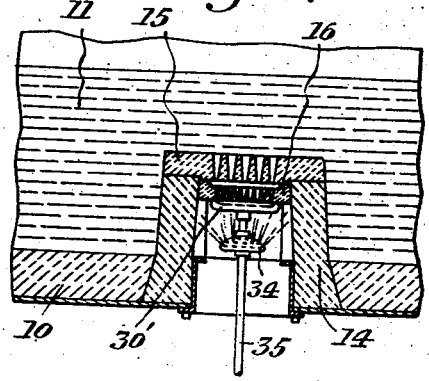
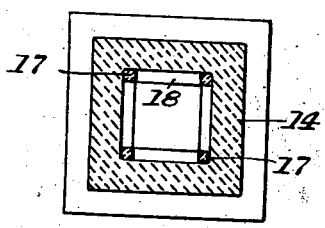
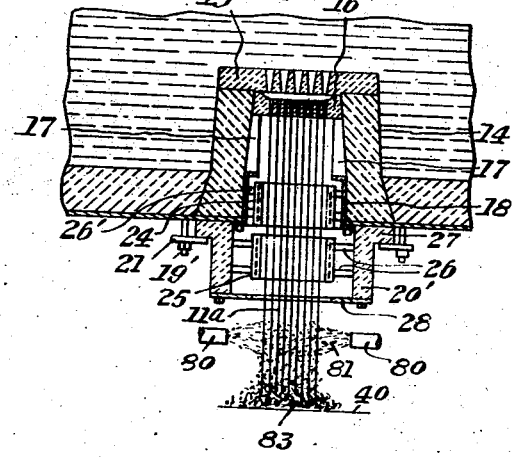
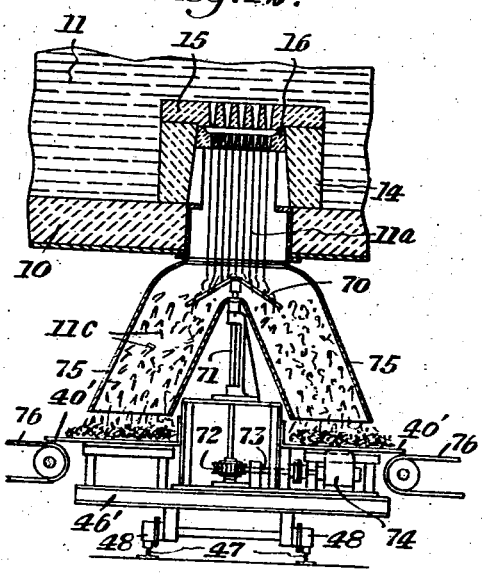
INVENTOR
Andrew H. Stewart
By Florence P. Byrnes
Attorney Patented Mar. 26, 1940

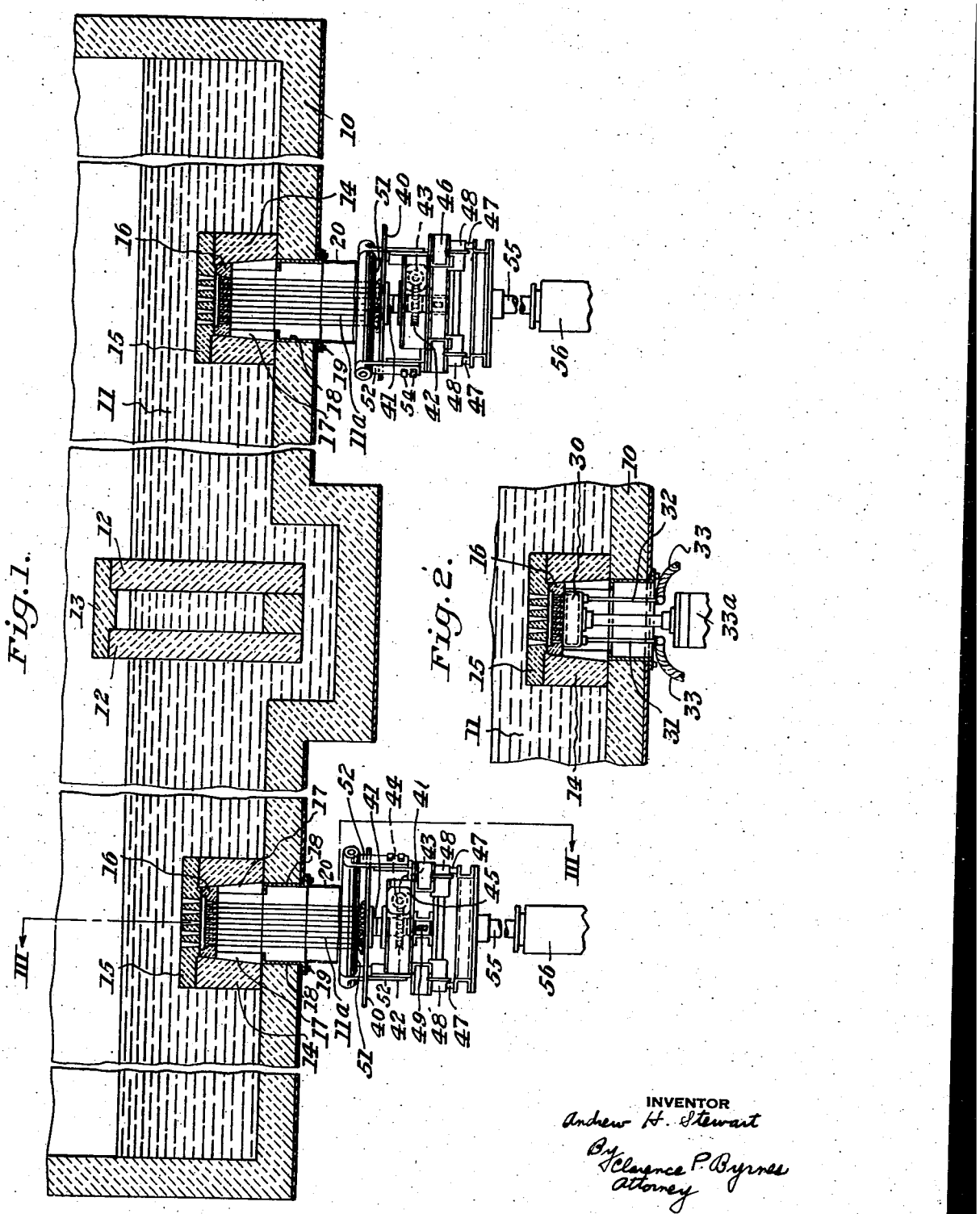
March 26, 1940.  A. H. STEWART  2,194,814
APPARATUS FOR MAKING INTERSTITIAL AGGREGATES
Filed April 6, 1936  3 Sheets-Sheet 1

2,194,814

UNITED STATES PATENT OFFICE 2,194,814

APPARATUS FOR MAKING INTERSTITIAL AGGREGATES

Andrew H. Stewart, Shields, Pa.

Application April 6, 1936, Serial No. 72,917

8 Claims. (Cl. 49—55)

This invention pertains to procedure for feeding a plurality of filaments or thread-like streams of material such as glass, and more particularly, to improved procedure for making interstitial aggregates of filament-like materials and to suitable apparatus for carrying out the procedure.

There has been an increasing need for insulating, filtering, and similar types of permeable and interstitial materials. This is no doubt an outgrowth of an increasing use as well as an increasing appreciation of the value of such materials. The demand has been for an inexpensive but an effective and practical form of material. Some of the materials of permeable meshes tend to deteriorate or change their form with age and/or usage. Interstitial aggregates of filament-like glass are felt to meet the requirements, provided that a good material of this type can be produced inexpensively.

However, in producing aggregates of such a material as glass which is fed at enhanced temperatures, many problems have arisen, particularly those of control. How to provide filaments of the proper characteristics, how to maintain such filaments at proper temperatures, and how to properly draw aggregates and/or compact them are some of the problems involved.

It has been an object of my invention to provide a new procedure for forming a plurality of filament-like portions of a material, such as glass which is plastic and/or viscous at enhanced temperatures.

Another object has been the provision of a simplified and also improved method of supplying, associating, and/or compacting interstitial aggregates.

A further object has been to better control the steps involved.

A still further object has been to provide a more economical procedure for making meshes or interstitial aggregates.

These and many other objects of my invention will appear to those skilled in the art from the following description taken in view of the claims and the appended drawings; in which—

Figure 1 is a side sectional view in elevation through a melting unit or tank having apparatus associated therewith for producing interstitial aggregates in accordance with the principles of my invention;

Figure 2 is a partial section in elevation showing a detail of my invention;

Figure 3 is a partial end section in elevation taken along the line III—III of Figure 1;

Figure 4 is a partial sectional elevation showing a modification;

Figure 5 is a plane section taken along the line V—V of Figure 4;

Figure 6 is an enlarged sectional elevation showing a detail of the illustrated embodiments of my invention;

Figure 7 is a plan view of the detail of Figure 6;

Figure 8 is a partial section in elevation similar to Figure 3, but omitting certain features of such figure;

Figure 9 is a plan section taken along the line IX—IX of Figure 8;

Figure 10 is a partial section in elevation similar to Figure 8, but showing a detail;

Figure 11 is a partial sectional view in elevation showing a modified embodiment of my invention; and Figure 12 is a partial section in elevation showing another embodiment of my invention.

Similar to my invention, glass wool or similar types of insulating meshes of refractory material have been produced by feeding molten glass in the ordinary manner from a furnace or forehearth through a single orifice into a blowing apparatus. The blowing apparatus was then actuated to separate the glass into a plurality of particles that are thrown upon a suitable carrier, which moves the particles to a compacting apparatus. The compacted particles may then be moved through an annealing chamber.

I have devised a new procedure for forming interstitial aggregates or meshes of glass and other insulating or refractory material by which steps previously necessary in the old procedures have been eliminated; and I have been able to better control the entire feeding and/or shaping operations to form aggregates of desired characteristics and of improved quality. In accordance with the principles of my invention, I simultaneously take a plurality of longitudinal portions and/or streams of glass from a suitable melting tank, forehearth, etc., in such a manner that thread-like or filament-like portions are formed by the feeding operation.

In a preferred form of my invention, I provide one or more feeder boxes or chambers each of which is preferably of an integral construction and of a ceramic material such as used for the walls of a forehearth or furnace. The box is positioned to extend from the floor of the melting tank or unit upwardly a suitable distance, in order to provide a glass drawing and/or attenuating chamber which is automatically heated by the heat which passes through the walls from the inside of the melting tank or unit. I place a feeder block having a plurality of feeder holes upon the top of the box and this block is preferably mounted at such a lever that it will be below the normal surface level and above the normal bottom level of the glass in the tank or melting unit. And, since the feeder block is automatically heated by the glass in the unit, a plurality of streams will flow vertically downwardly through the holes.

I contemplate mounting my feeder structure in the melting and/or refining end of a melting unit or tank (see Fig. 1), and also contemplate mounting it within the bridge wall between the refining and melting ends of the tank. In other words, my feeder apparatus can be mounted in any suitable location provided that the necessary molten or plastic material may be supplied to the feeder apparatus.

Although I find that the feeder block, which forms a top of the feeder box, may be sufficient to provide the necessary glass filaments, yet frequently it is desirable to form still smaller threads or filaments and to make allowance for any enlargement of the holes of this primary feeder or block member. And, for these reasons, I contemplate employing a secondary feeder member or block, which may be readily removed and replaced by other feeder block members having different sizes, arrangement, and/or shapes of feeder holes. This secondary block is, of course, removably supported from the bottom of the melting unit, in order that it may be readily adjusted and/or replaced.

The plurality of streams, lengths or filaments of glass, after being fed and/or attenuated downwardly from the feeder apparatus, are then moved into an abutting relationship and preferably rolled to the desired compactness. In one embodiment of my invention, I provide a table of metal or some other suitable material for receiving the threads, a grid for moving the threads into a grouped relationship, and a roller positioned above the table for compacting the thus-grouped threads or filament-like particles.

In another embodiment of my invention, the particles are at least partially cut and/or separated by a propeller blade which hurtles them through chutes upon a plurality of receiving tables.

From the above general description of my invention and of the operation thereof, it will appear that feeder apparatus constructed in accordance therewith may be mounted in connection with any of the common forms of melting tanks or units, and may be operated to bleed glass or take off glass filaments therefrom at certain times. That is, the glass in a tank must be maintained in a molten condition even when the normal pull is not being effected, such as on holidays and Sundays, and my invention makes it possible to manufacture interstitial aggregates during these periods and in this manner to increase the over-all efficiency of the plant.

To stop the flow at any time, I preferably provide a plug of some suitable material, such as metal (see Figs. 2 and 10) which is raised upwardly to a position under the plurality of feeder openings in the secondary feeder block. Thence, cooling fluid is passed through such plug which immediately causes the threads to harden over the openings and stop any further flow. To initiate the flow again, it is only necessary to remove the plug by lowering it away from the feeder openings. To facilitate this latter step, hot water or steam may be passed through the plug instead of cold water, or a suitable flame jet (see Fig. 10) may be applied to melt the previously frozen glass particles.

In Figure 1, I have shown an ordinary form of melting tank or unit 10 having molten glass 11 therein, and suitable bridge portions 12 and a cap 13 of refractory material for separating the melting end from the refining end. This figure discloses that any number of feeder structures embodying the features of my invention may be suitably located with respect to a melting unit or tank such as 10. As seen, the box-like chamber portion 14 is positioned to extend upwardly from the floor of the tank 10 and is supported adjacent the edges of an opening in such floor. This box-like member 14 (see particularly Fig. 9), is preferably of integral construction, in order to prevent seepage of the glass particles between joints; in some cases it may be advisable to form the primary feeder block 15 integral with such box. However, I have found that the weight of the mass of molten glass 11 tends to seal the joint between the box 14 and the primary member 15, and that this two-part construction is advantageous, in that the primary member may be independently replaced. As seen, the feeder chamber box 14 may have tapered or other suitably shaped side walls; it extends upwardly to form what may be termed a passage and temperature control chamber for the threads or filaments of glass which are fed outwardly from the tank 10.

A secondary feeder block 16 (see particularly Figures 6 and 7), as previously pointed out, may be provided. It is preferably removably supported in abutment with the primary block 15 by pillars or corner support members 17 (see particularly Figure 9) which extend upwardly from the floor level of the tank and which are removably supported by metal brackets 18 and suitable bolts 19. In some cases, depending upon whether attenuation is desired, the degree of attenuation desired, and/or the diameter of the glass filament particles fed, it may be desirable to provide a curtain member 20 which, as shown in Figures 1, 3 and 4, will extend downwardly from the bottom of the tank towards the filament aggregating apparatus. The curtain 20 is also removably mounted by means of the bolts 19.

In Figure 2, I have shown a form of glass flow stop plug 30 of hollow construction having fluid inlet and outlet pipes 31 and 32, which are supplied with cooling and heating fluids as desired by means of the tubing 33. The plug 30 is raised and lowered in a suitable manner, such as by means of a screw jack or a pneumatic or hydraulic plunger mechanism 33a.

In Figure 10, I have shown a modified form of plug 30' which, as shown, has a dished-out central portion and is provided with flame jets 34 for heating the plug when it is to be removed. The plug 30' is raised and lowered by any suitable actuating mechanism through the agency of the rod 35.

Referring particularly to Figures 6 and 7, it is seen that the secondary feeder block 16 is preferably provided with a centrally concave portion through which extends the plurality of feeder openings. Although I have shown tapered feeder openings, other suitable shapes or forms may be provided without departing from the spirit and/or scope of the present invention.

In the drawings, the numeral 11a designates the plurality of filament-like lines of glass which are fed from the melting tank 10. In some cases, particularly where very fine filaments or threads are to be utilized, I find it to be advisable to provide some form of auxiliary heating means for maintaining the filaments at desired enhanced temperatures as they are fed downwardly to the aggregating or mesh-forming apparatus. The filaments must be maintained at a suitable enhanced temperature as they would otherwise become brittle and could not be worked and/or formed in the desired manner.

In Figure 11 I have shown suitable auxiliary heating means. An auxiliary type of heater is particularly advantageous, where the feeder box 14 is omitted and the glass 11a is fed directly from the bottom of the tank or forehearth 10.

In Figure 11, I have shown upper and lower heaters 24 and 25, respectively, preferably of an electrical type; both heaters being of an open-center construction and having resistances set therein, see the dotted lines. The lower heater 25 is mounted upon a downwardly extending curtain 20' of refractory material by suitable spacer rods or lugs 26 which extend inwardly of the curtain and may serve to conduct electrical currents to the resistances. The upper heater member 24 likewise is supported by suitable spacer rods 26' which extend inwardly from the feeder chamber 14. As shown in this figure, the refractory curtain 20' is provided with outwardly extending shoulder portions 27 which are removably held against the bottom face of the tank 10 by brackets 21 and suitable bolts 19'. It may also be desirable to further conserve the heat within the chamber formed by the curtain 20' by providing a lower cover plate 28 having a suitable hole or slot for permitting the threads to flow downwardly therethrough.

In the embodiment of my invention shown in Figure 1, the plurality of glass threads 11a are permitted to fall upon a revolving metal plate 40 which is suitably actuated, as seen more particularly in Figure 3, by a vertical shaft 41 having a worm gear 42 that is actuated by a worm 43 mounted on the shaft 44 of a driving motor 45. The driving motor 45 and the support structure for the plate 40 are mounted upon a carriage whose wheels 48 are moved backwardly and forwardly along a track 47. The latter movement is imparted by a piston rod 49 and a pressure cylinder mechanism 50.

A compacting roller 51 is mounted to extend upwardly from the carriage 46; and it is journaled between a pair of opposite support brackets 52 which in turn are adjustably secured to a pair of brackets 53 extending upwardly from the carriage 46 by bolts 54. It will thus be seen that as the plate 40 rotates, the filaments are compacted beneath the roller 51. The plate is horizontally oscillated by the pressure mechanism 50, in order that the glass thread portions will be uniformly matted. To adjust the roller 51 and the plate 40 with reference to the glass feed, I have provided a piston rod 55 which is suitably actuated by a screw jack 56. In order that the apparatus may be definitely maintained at the proper adjusted height, it is advisable to provide a screw jack or to provide a pneumatic or hydraulic pressure mechanism with a position lock.

In the modification of Figure 4, I have shown a fork 60 which is pivotally mounted on a bracket 61 that extends from the bottom of the tank 10 and is adapted to oscillate back and forth, in order to move the glass filaments into abutment or association with respect to each other before they are received by the plate 40. It also functions to weave the threads back and forth across the plate as they are being fed and as the plate is being rotated and/or oscillated in the manner pointed out in connection with Figure 3. This fork is provided with a pair of prongs 62, and an operating arm 63 that is pivotally connected to the end of the fork member 60 and to a cam disk 64 which is actuated in any suitable manner as by a motor or pneumatic mechanism.

Although in the previously described embodiments of my invention, the glass threads have been preferably maintained in a plurality of continuous lengths before they are separated by the compacting apparatus, I also contemplate breaking up the threads into a plurality of portions before they are received by the aggregating or compacting apparatus. Such a type of structure is shown in Figure 12. In this connection, I have provided a V-shaped propeller blade 70 rotatably mounted on the shaft 71 and driven through the agency of a worm gear 72, worm shaft 73, and motor 74. The thread severing propeller 70 receives the glass threads 11a and breaks them up, hurtling them in opposite directions downwardly as small broken-up particles 11c, through a pair of oppositely positioned feeder spouts 75. The severing action and the associating action of the blade 70 can be controlled by varying its speed as well as by controlling the temperature of the filaments. The particles, as shown, are received on a pair of oppositely positioned tables 40', where they may be compacted and from which they may be taken by conveyors 76 to a suitable compacting, annealing and/or cutting apparatus. The tables are preferably mounted on a carriage 46' provided with wheels 48 adapted to run on tracks 47.

I have also found that it is possible to associate and/or aggregate suitable insulating or refractory materials, such as asbestos, with the glass filaments during the forming operation. As shown in Figure 11, the material which is preferably in a powdered form 81 is sprayed by nozzles 80 against the glass filaments 11a as they move away from the feeder apparatus. An aggregate 83 is produced. This aggregate may be compacted and treated in a manner similar to that previously pointed out in connection with the glass filaments, alone.

From the above description of the illustrated embodiments of my invention, it will appear that I provide a plurality of control features whereby desired types of interstitial aggregates may be produced. That is, I may change the shape of the openings in the primary feeder plates 15, but preferably in the secondary plates 16. I may also control the temperature of the filaments or threads of the glass as they are fed downwardly from the feeder openings by providing suitable heat retaining curtains such as 20 or 20', or by providing auxiliary heating devices such as 24 and 25 of Figure 11. Of course, it will be understood that although I have shown electrical heating elements, that any other suitable form may be utilized without departing from the spirit of my invention. I may also vary the level of the glass adjacent the feeder openings and thus control the head.

I have also provided means for varying the distance between the primary and secondary feeder members 15 and 16, and an aggregating and/or compacting apparatus which includes the receiving table 40. In this manner, the threads may be prevented from attenuating or may be given any desired attenuation and temperature conditioning prior to the step of actually compacting them as interstitial aggregates.

I have also provided apparatus for controlling the amount the interstitial aggregates are compacted. In accordance with the principles of my invention, the threads may be broken up prior to the time that they are received by the compacting or aggregating apparatus, see Figure 12, or may be moved together as a group while they are maintained in a thread-like continuous form, see Figures 1, 3, 4, and 5.

In view of these considerations, it will be appreciated by those skilled in the art that I have been able to provide a high quality interstitial aggregate fabricated from suitable plastic or viscous materials such as glass.

While I have described and illustrated several embodiments and/or modifications of my invention, it will appear to those skilled in the art that many changes, omissions, substitutions, or combinations thereof may be made without departing from the spirit and scope of the invention as indicated in the appended claims.

I claim:

1. In combination with a glass melting unit, a box chamber positioned to extend into the melting unit from the floor level thereof and to extend above a bottom level of the molten glass therein and to surround an opening in the floor of said unit, a feeder block means positioned adjacent an inner end of said box chamber and having a plurality of openings therein for simultaneously feeding a plurality of glass filaments therethrough.

2. In combination with a glass melting unit, chamber walls mounted adjacent a floor of the melting unit and surrounding an opening therein, said chamber walls extending inwardly into the melting unit, a primary feeder block positioned adjacent the inner end of said chamber walls and having a plurality of openings therein for feeding glass therethrough, a secondary feeder block positioned adjacent said primary block and having a plurality of openings therein for feeding glass filaments therethrough into the chamber, auxiliary heating means positioned adjacent said chamber walls for maintaining the filaments at suitable temperatures while they move through the chamber, and means for associating the filaments to form an aggregate.

3. In combination with a tank container for hot molten or viscous material, said container having suitable base and wall portions for maintaining the material therein, a box-like chamber extending inwardly of the base portion of the tank past the bottom level of the material therein, a feed block at the inner end of said chamber opening into the tank, said feed block having at least one feed orifice therein, said orifice feeding material from the tank along the length of said box-like chamber in such a manner that the material fed will be maintained at an enhanced temperature by heat entering said chamber from the tank container.

4. In combination with a tank container for hot molten or viscous material, a chamber positioned to extend into the tank container and above a bottom level of the hot material therein, and a feed orifice opening from said tank container into said chamber adjacent an inner end of said chamber.

5. In combination with a tank container for hot molten or viscous material, said container having suitable base and wall portions for maintaining material therein, a feed block means opening into said tank, said feed block means having at least one feed orifice therein, a feed chamber mounted on the container and about the orifice in said feed block means and extending outwardly from said feed block means, and means associated with said feed chamber for maintaining it at a suitable temperature, said feed chamber extending in the direction of the material fed from the orifice and above a bottom level of the hot material in the tank container, so that said material may be maintained at a suitable temperature after it has left the orifice of said feed block means.

6. In combination with a tank container for hot molten or viscous material, a chamber positioned to extend within at least a portion of the tank container and to be surrounded by at least a portion of the hot material therein, and a feed orifice opening from said tank container into said chamber adjacent an inner end of said chamber.

7. In a combination as defined in claim 6, auxiliary heating means positioned adjacent said chamber for maintaining material fed from said orifice at a suitable temperature.

8. In combination with a container for hot molten or viscous material, a chamber positioned to extend into the container and within the confines of at least a portion of the material therein, and a feed orifice opening from said container into said chamber adjacent an inner portion of said chamber.

ANDREW H. STEWART.